UNITED STATES PATENT OFFICE.

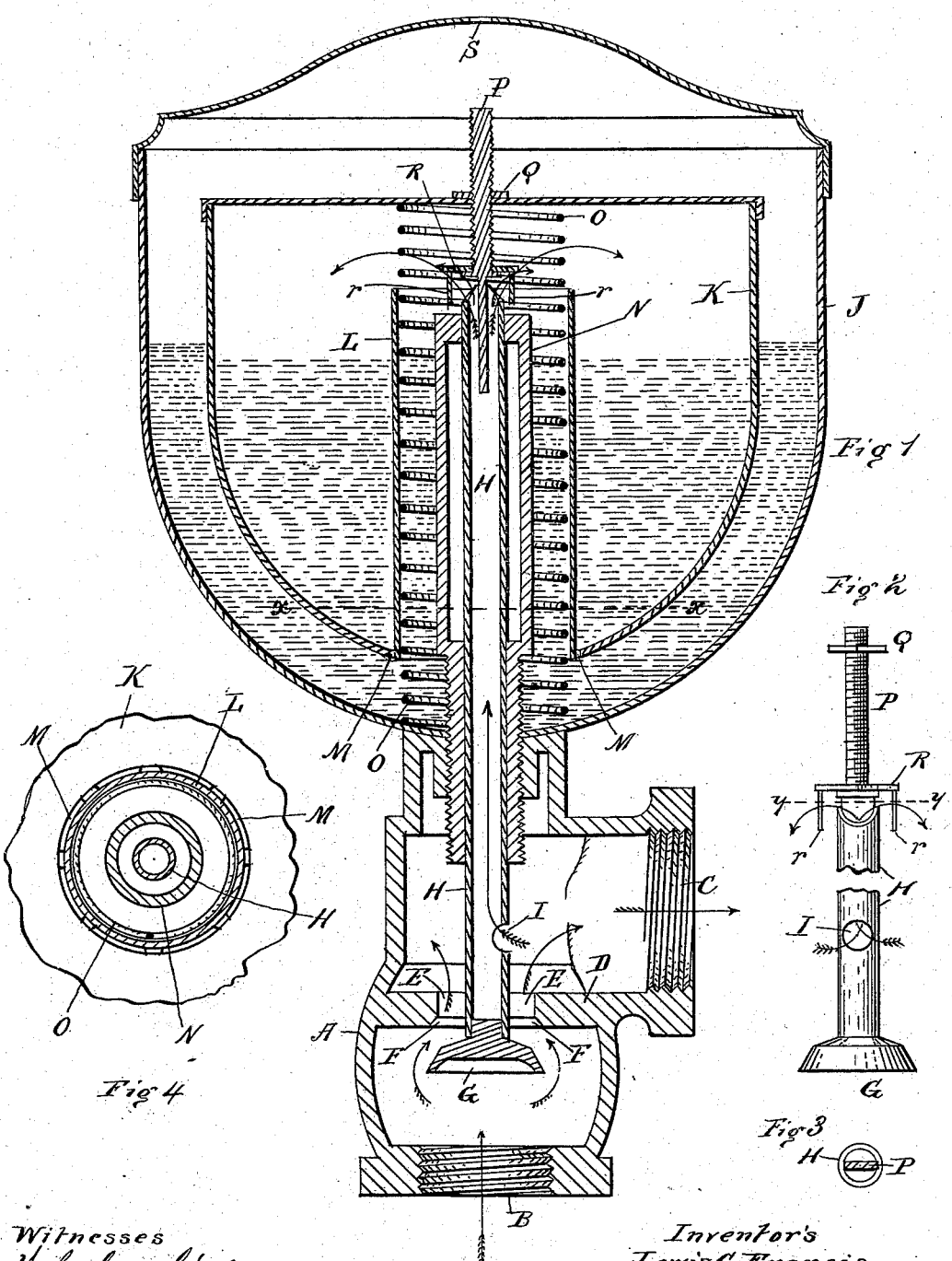

LEWIS G. FRANCIS, OF LA GRANGE, AND JOHN A. TIBBS, OF HINSDALE, ILLINOIS.

GAS-PRESSURE REGULATOR.

SPECIFICATION forming part of Letters Patent No. 295,532, dated March 25, 1884.

Application filed December 13, 1883. (No model.)

*To all whom it may concern:*

Be it known that we, LEWIS G. FRANCIS and JOHN A. TIBBS, citizens of the United States, and residing at La Grange, Cook county, and Hinsdale, in the county of Du Page, and State of Illinois, have invented certain new and useful Improvements in Gas-Pressure Regulators, which are fully set forth in the following specification, reference being had to the accompanying drawings, in which—

Figure 1 represents a vertical sectional view of our improved regulator; Fig. 2, a side view of the valve and valve-stem detached from the regulator. Fig. 3 is a transverse sectional view of the valve-stem, taken on the line $y\,y$, Fig. 2; and Fig. 4 is a transverse sectional view taken on the line $x\,x$, Fig. 1, looking down.

Our invention relates to that class of gas-pressure regulators in which the increased pressure of the gas serves to close a valve and shut off part of the gas-supply, and keep a uniform pressure at the burner, although the pressure from the supply varies.

Our invention consists in the special combinations and improvements hereinafter specified, whereby the parts which operate to close the valve and maintain a uniform pressure between the valve and burner are simplified, and also made more sensitive to the operation of the varying pressure of gas through the supply-pipe.

In the accompanying drawings, A represents a two-way joint that is designed to be placed in a gas-pipe. The pipe is connected to this two-way joint at B, which we will call the "inlet-pipe." The pipe leading to the burners, which we will call the "outlet-pipe," is connected to it at C. The two-way joint A has a diaphragm, D, extending across it at the top of its enlarged bottom portion. The diaphragm is provided with an opening, E, which is enlarged at its bottom by a flaring surface, F, to form a valve-seat.

G is a valve, and H a valve-stem. This valve-stem is hollow, and is provided with an opening, I, which opens into the two-way joint A above the diaphragm D, so that the gas, after passing through the opening E, can pass through the opening I, as well as into the outlet-pipe.

J is a sheet-metal case, made spherical in form at its bottom, substantially as the shape shown.

K is a float, also made spherical in form at its bottom, and is inclosed in the case J. This float is tight at its top, but has an opening at its bottom, which receives a tube, L. The tube L fits into the opening at the bottom of the float K; but there are small openings M around the bottom of this tube, where it is joined to the case K, to admit of the liquid in the float gradually flowing from the float K into the case J when the float is raised, as hereinafter described.

N is a tube, which screws into the joint A, as shown, and can be screwed up or down, so as to extend higher or lower into the float K. The valve-stem H fits into this tube, and is held vertically in position by it.

O is a sensitive spiral spring, which rests on the bottom of the case J, and extends up in the tube L to the top of the float K.

P is a screw-threaded rod rigidly attached to the top of the hollow valve-stem H in such a manner as not to close the top of the hollow valve-stem. This rod P extends up through the top of the float K.

Q is a nut that screws upon the top of this screw-threaded rod P, and rests against the top of the float K. This nut causes the valve G and valve-stem H to be suspended from the top of the float K.

R is a nut screwed upon the screw-threaded rod P, and has two short pins, $r$, projecting down from the under side of the nut, which serves as a stop to strike against the top of the adjustable tube N, and so as not to entirely close the openings in the top of the valve-stem H when the same is lowered below the top of the adjustable tube, and also regulates the distance which the valve G can open, and the tube N can be raised and lowered to give the valve G greater or less play, as desired. The shaded lines in the float K and case J indicate a liquid, preferably glycerine; but we may use any liquid floating material for floating the float K in the case J. The floating liquid carries nearly all of the weight of the float K and valve G and valve-stem H; but the coil-spring O takes a small portion of such weight and gives to the float steadiness when there is varying pressure to the gas.

S is an opening in the top of the case J, to relieve any pressure that there might otherwise be in the top of the case above the float K.

The operation of our regulator is as follows: When it is placed in the gas-pipe, the supply-pipe being attached at B and the outlet-pipe at C, the normal position of the valve G is the position shown in the drawings, the valve being open to the full size of the supply-pipe. To admit of this the joint A is made larger below the diaphragm D than the supply-pipe, which gives ample space for the gas to pass around the valve O. The gas passes through the diaphragm D into the hollow valve-stem H, and up into the top of the float K. The float is so adjusted as not to be raised by the gas until a certain pressure is reached, that pressure being just the pressure desired to supply the burners connected with the outlet-pipe C. When that pressure is exceeded, the float K is raised by the gas passing from the hollow stem H into the top of the float above the glycerine, and the valve G is raised by the float and partially closed, which shuts off a portion of the pressure and gives a pressure uniform and steady at the burner. The spring O assists the floating material in holding the float K steady, and prevents a sudden movement of the float, which is liable to give to the flame at the burner a flickering or unsteadiness, which is very objectionable. When the float K is raised, the floating material in the float gradually runs out through the openings M, and when the float sinks again in the floating material it flows back through the openings M into the float gradually. This also serves to give to the float steadiness in its vertical movements, caused by the varying pressure of the gas in the float. The spherical shape of the float and case enables us to carry a larger quantity of the floating material in the float K, which is an advantage, and it also prevents any tendency to tip sidewise, which is the best floating form to give to the float. It will be observed that we have but a very few parts in our regulator, and by making the valve-stem hollow we are able to have a detachable center tube, N, which serves simply as a support and guide for the operating parts. This makes our regulator very cheap and efficient.

Having fully described the construction and operation of our improvements, what we claim, and desire to secure by Letters Patent, is—

1. The combination, in a gas-pressure regulator, of the valve G, diaphragm D, provided with an opening, E, the hollow valve-stem H, provided with an opening, I, the float K, and case J, and mechanisms for guiding the valve-stem, substantially as specified and shown.

2. In a gas-pressure regulator, the combination of the case J, float K, the tube L, and the spiral spring O, as specified and shown.

3. The combination, in a gas-pressure regulator, of the adjustable tube N, the hollow valve-stem H, the float K, and case J, as specified and shown.

LEWIS G. FRANCIS.
JOHN A. TIBBS.

Witnesses:
W. C. CORLIES,
A. M. BEST.